Patented Aug. 28, 1945

2,383,765

UNITED STATES PATENT OFFICE 2,383,765

DECORATIVE EFFECTS IN POLYSTYRENE MOLDINGS

Russell R. Bradshaw, Midland, Mich., assignor to The Dow Chemical Company, Midland, Mich., a corporation of Michigan No Drawing. Original application February 24, 1939, Serial No. 258,212. Divided and this application December 30, 1942, Serial No. 470,645

9 Claims. (Cl. 260—41)

This invention relates to the production of decorative effects in polystyrene moldings.

An object of the invention is to provide a simple inexpensive method of preparing polystyrene molded objects having a lustrous pearlescent appearance.

According to the invention, polymerized styrene is mixed together with a small proportion of a hymolal salt and the resulting mixture is molded under heat and pressure into objects having a high surface luster and a pleasing nacreous appearance resembling mother-of-pearl.

In practice, a charge of polystyrene and a small proportion, e. g., between about 0.5 and about 10 per cent by weight of a hymolal salt is heated to a temperature at which the polystyrene is of a plastic or dough-like consistency, and is then subjected to mechanical working so as to incorporate the hymolal salt into the plastic mass. This working is preferably carried out in a kneading machine or on heated rolls, but other types of mixing apparatus may be employed. After the mixing operation, the plastic mass may be molded directly into objects of any desired size or shape, either by compression- or injection-molding, according to known procedures. Alternatively, after mixing, the plastic mass may be cooled and ground or otherwise reduced to a powder, which is then used in subsequent molding operations.

A variety of decorative effects may be produced in polystyrene according to the invention by varying the proportion of hymolal salt used and by carefully controlling the mixing and molding procedures. For example, when the polystyrene and hymolal salt are kneaded together for a short time only so that mixing is incomplete, i. e. so that the resulting product is non-homogeneous and the mixture is then molded, objects of delicate striated or marbleized iridescent appearance are obtained. However, when a thorough mixing is carried out so as to produce a homogeneous plastic mass, the articles molded therefrom resemble natural pearl. Further interesting effects may be produced by incorporating dyes, pigments, plasticizers, etc., in the charge of polystyrene and hymolal salts prior to or during the mixing procedure.

The hymolal salts which may be used in the invention are the sodium, potassium, and magnesium salts of sulfated higher aliphatic alcohols, such as sodium lauryl sulfate, sodium cetyl sulfate, etc., and mixtures thereof, often sold under the trade-names of "Dreft," "Duponol M. E.," and the like. In practice, the hymolal salt is preferably added to the polystyrene in the form of chips, flakes, "beads," or powder, although other forms may be used.

Polystyrene molded objects according to the invention, in addition to having the pleasing appearance described, are stable towards light and are unaffected by water or aqueous solutions. They possess the further advantage that they are easier to eject from the mold in which they are formed than ordinary polystyrene moldings.

Other modes of applying the principle of the invention may be employed instead of those explained, change being made as regards the details disclosed, provided the method or product stated in any of the following claims, or the equivalent thereof be employed.

This application is a division of my co-pending application Serial No. 258,212, filed February 24, 1939, now Patent No. 2,330,108 issued September 21, 1943.

I claim:

1. A molded object characterized by a nacreous sheen and essentially consisting of polystyrene having incorporated therein between about 0.5 and about 10 per cent by weight of a salt selected from the group consisting of the sodium, potassium, and magnesium salts of sulfated alkyl alcohols containing at least 12 carbon atoms in the alkyl radical thereof, this salt being present in an amount effective to cause a nacreous sheen.

2. A molded object characterized by a nacreous sheen and essentially consisting of 100 parts of polystyrene and 0.5 to 10 parts of a sodium salt of a sulfated alkyl alcohol containing at least 12 carbon atoms in the alkyl radical thereof, this salt being present in an amount effective to cause a nacreous sheen.

3. A product according to claim 2 wherein the salt is sodium cetyl sulfate.

4. A molding powder suitable for molding into objects having a nacreous appearance and essentially consisting of polystyrene having incorporated therein between about 0.5 and about 10 per cent by weight of a salt selected from the class consisting of the sodium, potassium, and magnesium salts of sulphated alkyl alcohols containing at least 12 carbon atoms in the alkyl radical thereof, this salt being present in an amount effective to cause a nacreous sheen.

5. A molded object presenting a marbleized iridescent appearance and consisting essentially of polystyrene having non-homogeneously mixed therewith between about 0.5 and about 10 per cent by weight of a salt selected from the class consisting of the sodium, potassium, and magnesium salts of sulfated alkyl alcohols containing at least 12 carbon atoms in the alkyl radical thereof.

6. A process of preparing a polystyrene plastic characterized by a nacreous sheen which comprises forming a plastic mixture consisting essentially of polystyrene and from about 0.5 to about 10 per cent by weight thereof of a salt selected from the class consisting of the sodium, potassium, and magnesium salts of sulphated alkyl alcohols containing at least 12 carbon atoms in the alkyl radical thereof, this salt being present in an amount effective to cause a nacreous sheen, and thereafter molding said plastic mixture.

7. A method of forming a polystyrene molding powder for producing objects characterized by a nacreous sheen which comprises heating polystyrene to a temperature at which it is plastic and kneading the same together with between about 0.5 and about 10 per cent by weight of a salt selected from the group consisting of the sodium, potassium, and magnesium salts of sulphated alkyl alcohols containing at least 12 carbon atoms in the alkyl radical thereof, this salt being present in an amount effective to cause a nacreous sheen, cooling the mixture thus obtained, and reducing it to a powder.

8. The method of producing decorative effects in polystyrene molded objects which comprises heating polystyrene to a temperature at which it is plastic and kneading the same together with between about 0.5 and about 10 per cent by weight of a salt selected from the group consisting of the sodium, potassium, and magnesium salts of sulphated alkyl alcohols containing at least 12 carbon atoms in the alkyl radical thereof to incorporate the said salt into the plastic mass, the said kneading being carried out for a time insufficient to produce a homogeneous mixture, and the salt being present in an amount effective to cause a nacreous sheen, and molding the mixture thus obtained into objects by application of heat and pressure.

9. A molded object characterized by a nacreous sheen and essentially consisting of 100 parts of polystyrene and from 0.5 to 10 parts of sodium lauryl sulphate, the latter being present in an amount effective to cause a nacreous sheen.

RUSSELL R. BRADSHAW.